(12) United States Patent
Gill et al.

(10) Patent No.: US 12,481,532 B2
(45) Date of Patent: Nov. 25, 2025

(54) IDENTIFYING HOTSPOTS AND COLDSPOTS IN FORECASTED POWER CONSUMPTION DATA IN AN IT DATA CENTER FOR WORKLOAD SCHEDULING

(71) Applicant: HEWLETT PACKARD ENTERPRISE DEVELOPMENT LP, Houston, TX (US)

(72) Inventors: Mantej Singh Gill, Bangalore (IN); Dhamodhran Sathyanarayanamurthy, Bangalore (IN); Arun Mahendran, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 546 days.

(21) Appl. No.: 17/862,989

(22) Filed: Jul. 12, 2022

(65) Prior Publication Data

US 2024/0020157 A1    Jan. 18, 2024

(51) Int. Cl.
*G06F 9/50* (2006.01)
*G06N 20/00* (2019.01)

(52) U.S. Cl.
CPC .......... *G06F 9/5027* (2013.01); *G06N 20/00* (2019.01)

(58) Field of Classification Search
CPC ........ G06F 9/50; G06F 9/5005; G06F 9/5011; G06F 9/5027
See application file for complete search history.

(56) References Cited

U.S. PATENT DOCUMENTS 11,860,594 B2 *    1/2024    Anderson ............ G05B 19/042

OTHER PUBLICATIONS

Li, Y., et al., "Learning-Based Power Prediction for Data Centre Operations via Deep Neural Networks", Jun. 21, 2016, 10 pages.
Lin et al., "An Artificial Neural Network Approach to Power Consumption Model Construction for Servers in Cloud Data Centers", IEEE Transactions on Sustainable Computing, Apr. 11, 2019, 12 pages.
Wu, W., et al., "A Power Consumption Model for Cloud Servers Based on Elman Neural Network", IEEE Transaction on Cloud Computing, Jun. 12, 2019, 10 pages.

(Continued)

*Primary Examiner* — Andy Ho
(74) *Attorney, Agent, or Firm* — Sheppard Mullin Richter & Hampton LLP

(57) ABSTRACT

Systems and methods are provided for using historic input power periodic data from a server in an IT data center to train a machine learning (ML) model to obtain forecasted power consumption data of the server for a future time period. Time windows of hotspots or coldspots are then identified in the forecasted power consumption data, hotspots being defined as areas or regions of over-utilization in a time series data, and coldspots being defined as areas or regions of under-utilization in a time series data. The hotspots and coldspots are identified by calculating an exponential mean average (EMA) of the forecasted power consumption data, taking points above the EMA as hotspots and points below the EMA as coldspots. The identified hotspots and coldspots can be used to schedule workloads for a server or a data center, to more efficiently plan existing workloads, or to introduce new workloads at more optimal time periods.

20 Claims, 6 Drawing Sheets

(56) References Cited

OTHER PUBLICATIONS

Masum, S. et al., "Multi-step Time Series Forecasting of Electric Load using Machine Learning Models," Int'l Conference on Artificial Intelligence and Soft Computing, Springer International Publishing, May 11, 2018, pp. 148-159 https://researchportal.port.ac.uk/files/10674314/5234.pdf.

Shahin, A. et al., "Using Multiple Seasonal Holt-Winters Exponential Smoothing to Predict Cloud Resource Provisioning," arXiv preprint arXiv:1701.03296, Jan. 12, 2017, https://arxiv.org/pdf/1701.03296.

Zhao, P. et al., "On Predicting the PUE with Gated Recurrent Unit in Data Centers," Dec. 6, 2019, IEEE 5th Int'l Conference on Computer and Communications (ICCC), pp. 1664-1670, https://ieeexplore.ieee.org/document/9064040.

\* cited by examiner

IDENTIFYING HOTSPOTS AND COLDSPOTS IN FORECASTED POWER CONSUMPTION DATA IN AN IT DATA CENTER FOR WORKLOAD SCHEDULING

BACKGROUND

Planning and acquiring infrastructure in a data center is a common recurring task. Appropriate energy metrics are required to determine the power requirements of a server and, more broadly, of a data center. Standard input power supply generation is too often a "one size fits all" strategy, which can increase cost and lower performance and health of a data center. Such problems require pragmatic solutions to assist data center administrators in managing their resources more efficiently and reducing the overall cost associated with running the infrastructure.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
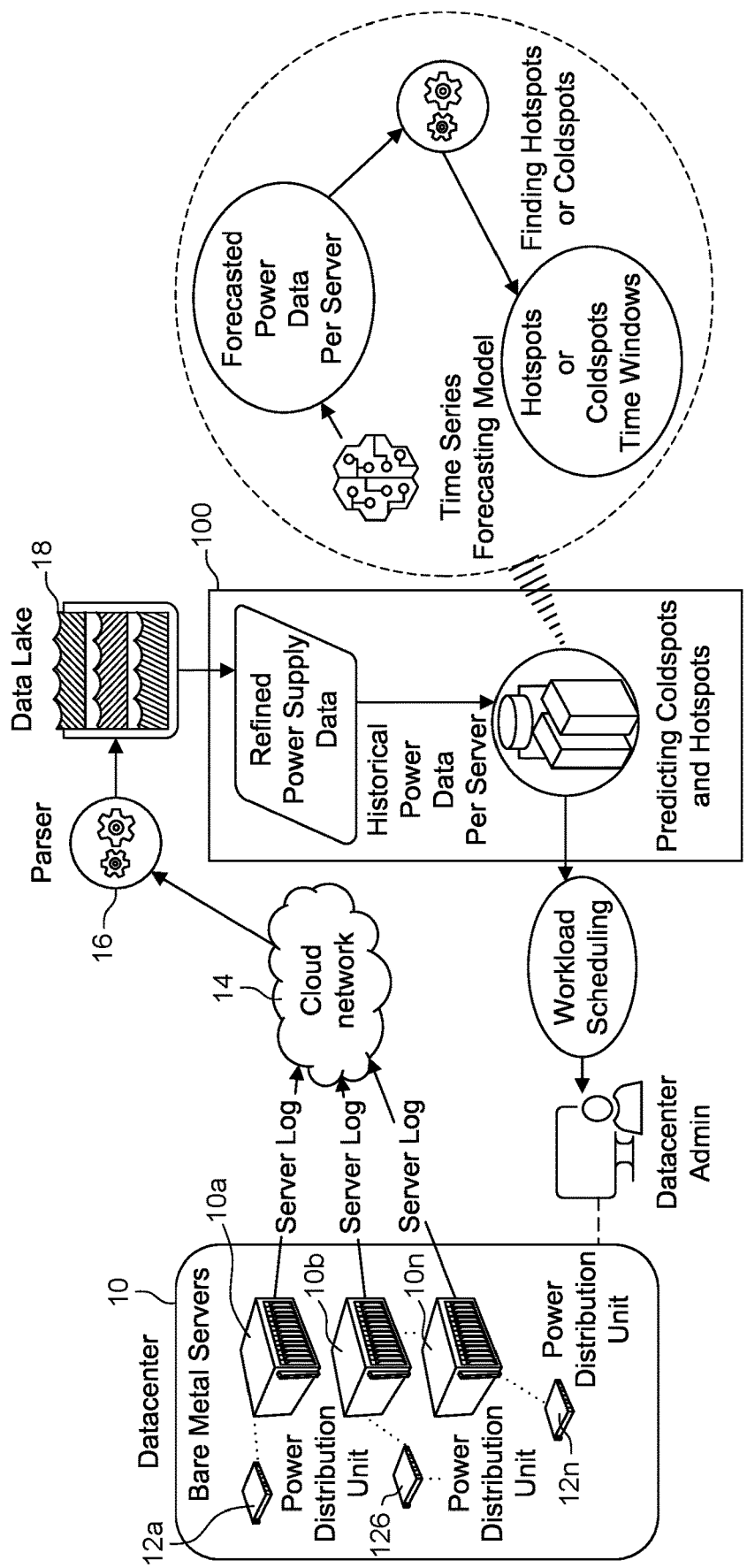
FIG. 1 is a diagram showing an overall data flow in accordance with examples of the application.

The figures are not exhaustive and do not limit the present disclosure to the precise form disclosed.

DETAILED DESCRIPTION

Data center administrators routinely face challenges of when and how often to introduce a new workload, be it once or periodically. Efficient scheduling of new workloads can help save running costs by avoiding peak hour usage and can help in the long term running efficiency of a server and its periphery. For example, overloading of a power supply unit can cause overheating, which can adversely affect the functioning of the server. Conversely, under-utilization of a power supply unit at various times can lead to inefficiencies and can put undue strain on the power supply unit during other times. Limiting the amount of input power supplied can help reduce waste and avoid superfluous cost in running a server or data center. Conventional approaches to addressing these issues are less optimal than desired. For example, in one conventional approach a user must provide the server's configuration, based on which a predefined power requirement is returned; consequently this approach suffers from a technical problem in that the power requirement of a server cannot be dynamically predicted based on the server's historical pattern of power usage, and therefore usage of the power requirement is more limited.

With the present disclosure forecasted electric power consumption of each server can be obtained and used for gathering power usage requirements in order to determine and plan the capacity of infrastructure required in a server or data center. Such forecast can also help determine the efficiency of a power supply. By virtue of the features of the present disclosure, the power requirement of a server can be dynamically predicted based on its historical pattern of power usage. Servers that are consuming more power or less power than is optimal can be flagged in order to take appropriate action. Greater savings in power costs can be realized, as well as improved efficiency of a power supply, which can have advantageous effects such as greater longevity and reliability of the power supply, and often greater longevity of the server. The carbon footprint of a server or data center can also be reduced.

A technical problem with conventional approaches is the lack of ability to make better use of forecasted power consumption data. The present disclosure can provide a technical solution of leveraging forecasted power consumption data to optimally identify periods of over-utilization and under-utilization so that future workloads can be scheduled or revised more efficiently and productively. Examples of the present disclosure use historic input power periodic data from a server in an IT data center (e.g., time series input power sensor data from a server's power supply unit) to train a machine learning (ML) model to obtain forecasted power consumption data of the server for a future time period. Time windows of hotspots or coldspots are then identified in the forecasted power consumption data, hotspots being defined as areas or regions of over-utilization in a time series data, and coldspots being defined as areas or regions of under-utilization in a time series data. In an example the hotspots and coldspots are identified by calculating an exponential mean average (EMA) of the forecasted power consumption data, taking points above the EMA as hotspots and points below the EMA as coldspots. An EMA can be calculated using known methods. One such method is the open-source python package pandas function.

Technical advantages are realized throughout the application. The identified hotspots and coldspots can be used to schedule workloads for a server or a data center, to more efficiently plan existing workloads, or to introduce new workloads at more optimal time periods. This can for example prevent overloading of a power supply which may cause overheating, or flag servers that are consuming less power in order to take appropriate action. For example, consecutive hotspots in a single time window can be identified for scheduling a reduced workload in the single time window, or consecutive coldspots in a single time window can be identified for scheduling an increased workload in the single time window. Overall cost savings and improved health and longevity of power supplies and servers can be realized. Solutions of the present disclosure can be implemented in a number of ways including as Software as a Service (SaaS), as Platform as a Service (PaaS), in a cloud-based or cloud computing environment using underlying hardware components, or in a server in an IT data center, among others.

It should be noted that the terms "optimize," "optimal" and the like as used herein can be used to mean making or achieving performance as effective or perfect as possible.

However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 is a diagram showing an overall data flow in accordance with an example of the application. As will be described in more detail herein, a machine learning (ML) model is used for learning and predicting the power consumption of a server for a next or future time period (e.g., 7 days) using a past time period of input power periodic data (e.g., 1 month), to obtain forecasted power consumption data of the server. Then, the forecasted power consumption data of the server is used to find hotspots and/or coldspots in the forecasted power consumption data and present the same to a user or data center administrator unit or automated software system that can then use this information to more efficiently and productively introduce new workloads or revise existing workloads. (It is of course to be understood that the examples of time periods provided herein are non-limiting.)

As shown in FIG. 1 a data center 10 includes one or more servers 10a, 10b, . . . , 10n. Each server has a respective power supply or power distribution unit 12a, 12b, . . . 12n which records electric power consumption in respective server logs (e.g., Active Health System logs). Each server log may collect input power periodic data of the respective server (using for example sensor data from each server's power supply) from any past time period (e.g., 3 months, 6 months, 9 months, or any other suitable length of time) at a certain frequency (e.g., every two minutes or every five minutes or any other suitable frequency). The input power periodic data (e.g., time-series data) from each server for which the future consumption rate is being forecast is then transmitted through a cloud network 14 or any other suitable network to data parser 16 to be received by data lake or data aggregator 18. With respect to the data parser 16, in an example Active Health System files are received from individual servers in encoded binary format log files which contain the time series power data. The data parser 16 decodes and converts this data into json format which is consumed for further processing. The data lake or data aggregator 18 aggregates server inventory data with the power supply data. The data is then refined (quality can be assured) and stored for future consumption.

In computing component 100, as described in more detail below, the data from the data aggregator 18 is processed to create refined power supply data which is used for training a ML model to obtain forecasted power consumption data, and then hotspots and coldspots are identified in the forecasted power consumption data as further described in connection with FIG. 2. The ML model can be served via REST API endpoints, in one example implementation. A data center administrator unit 20, as noted above, which may be controlled by a user, schedules workloads based on the hotspot and coldspot prediction data. The present disclosure can apply to multiple servers 10a, 10b, . . . 10n as shown in FIG. 1 for analyzing a data center, or to a single server for analyzing only that server.

Figure 2:
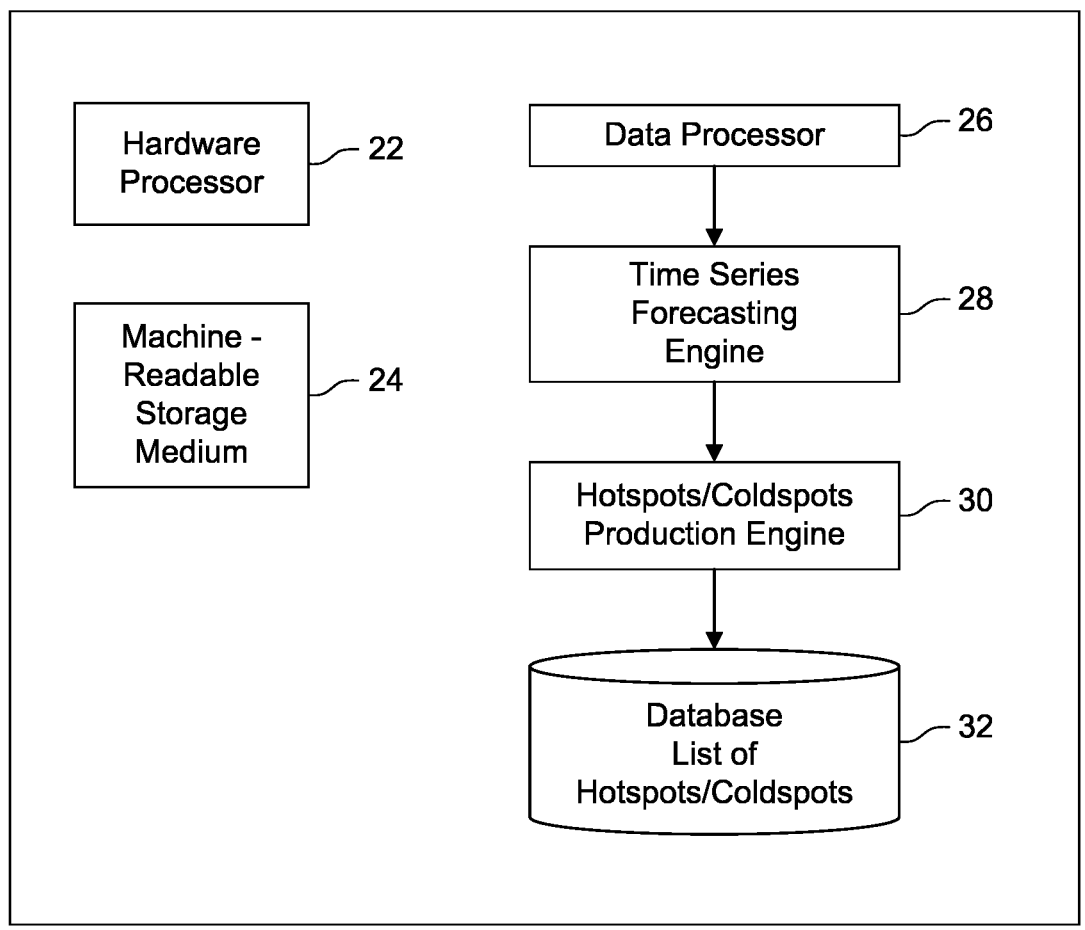
FIG. 2 is a block diagram illustrating an example computing component for carrying out processes including obtaining forecasted power consumption data and identifying hotspots and coldspots in the forecasted power consumption data, in accordance with examples of the application.

FIG. 2 is a block diagram illustrating an example of the computing component 100 shown in FIG. 1 for carrying out processes including obtaining forecasted power consumption data and identifying hotspots and coldspots in the forecasted power consumption data, in accordance with examples of the application. The computing component 100 includes one or more hardware processors 22, a machine-readable storage medium 24, a data processor 26, a time series forecasting engine 28, and a hotspots/coldspots prediction engine 30. It is noted that while the data processor 26, the time series forecasting engine 28, and the hotspots/coldspots prediction engine 30 are shown in FIG. 2 as being implemented in the same computing component, it should be readily understood that the same elements can each be implemented in separate computing components or can be combined into one or more computing components.

The computing component 100 may, for example, be implemented in a cloud-based environment such as Saas/PaaS using underlying hardware components, a server computer, a controller, or any other similar computing component capable of processing data. In one non-limiting example the computing environment may be a 2 core 64-bit processor, with 32 GB of memory, and open-source Python packages may be the external dependencies. Hardware processor 22 may be one or more central processing units (CPUs), semiconductor-based microprocessors, and/or other hardware devices suitable for retrieval and execution of instructions stored in machine-readable storage medium 24. Hardware processor 22 may fetch, decode, and execute instructions for performing methods in accordance with the disclosure, to control processes or operations for optimizing the system during run-time. As an alternative or in addition to retrieving and executing instructions, hardware processor 22 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 24, may be any electronic, magnetic, optical, or other physical storage device that contains or stores executable instructions. Thus, machine-readable storage medium 24 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 24 may be a non-transitory storage medium, where the term "non-transitory" does not encompass transitory propagating signals. As described in detail below, machine-readable storage medium 24 may be encoded with executable instructions, for example, instructions for performing methods in accordance with the disclosure.

The data processor 26 receives and processes or transforms data stored in the data aggregator 18. The processing by the data processor 20 includes detecting and removing outliers in a dataset of input power periodic data. This includes linearly interpolating any missing values in a dataset of input power periodic data using known techniques and removing outliers in the data. One-Class SVM is a known anomaly detection technique that can be used here for detection and removal of outliers. The data is resampled, and only the average power consumed by the system is captured every interval (e.g., every hour or every two hours or any suitable interval). Accordingly technical challenges overcome in processing a dataset for inputting into the ML model include the ability to process large amounts of data and to handle duplicate and missing data. The refined power supply data thus created is referred to herein as a base dataset for training and validating the ML model's prediction for the server(s) being analyzed.

In one non-limiting example the past 70 days of data are used for training and validating the ML model's prediction.

In another non-limiting example the past 12 months of data are used. Techniques such as Mean Absolute Percentage Error and Root Mean Square Error can be used to validate the prediction; for example, from the base dataset, the first 70 days of data can be used for training a model for a server, and after successful training, the next 20 days of the dataset can be used for validation. This process can be repeated on multiple servers. In some examples a parameter of the past X days of data can be set as the minimum time period of data that is required for the processing, and until X days of data are included no data processing is performed.

Challenges in selecting and implementing the training method include large training time due to limited hardware resources. One preferred method of training to overcome such challenges is distributed training over multiple VMs to generate models for each server, and re-training with a warm-start strategy for shorter re-training time. The training can be optimized using scripts written to dynamically choose the best set of hyperparameters for each of the models. In one non-limiting example, the hyperparameters with the below combinations of parameter and their values can be used:

Changepoint_prior_scale: [0.001, 0.01, 0.05]. This parameter determines the flexibility of a trend, and in particular how much the trend changes at the trend changepoints. If too small the trend will be underfitting and variance that should have been modeled with trend changes will instead end up being handled with the noise term. If too large, the trend will overfit and in the most extreme case can end up with the trend capturing yearly seasonality. The default of 0.05 works for many time series, but this could be tuned; an example range may be about [0.001, 0.5].

Seasonality_prior_scale: [0.01, 0.1, 1.0, 10]. This parameter controls the flexibility of the seasonality. Similarly, a large value allows the seasonality to fit large fluctuations, and a small value shrinks the magnitude of the seasonality. The default is 10, which applies basically no regularization. An example range for tuning this parameter may be about [0.01, 10]; when set to 0.01 one should find that the magnitude of seasonality is forced to be very small.

Daily_seasonality: [True, False].

Growth: logistic.

The time series forecasting engine 28 receives at least one dataset of input power periodic data from a server or from the data processor 26 which has created a base data set. The time series forecasting engine 28 uses the at least one dataset of input periodic data, which is from a past time period, to train a ML model to obtain forecasted power consumption data of the server for a next or future time period. Known ML models or algorithms for this purpose include but are not limited to FBProphet, SARIMA/SARIMAX, Holt-Winter-ES, and Gated Recurrent Unit (GRU) Network. These models have appropriate training time and size to work with the techniques of the present disclosure. In one example the train-test split was 80-20 percent.

FBProphet is open-source software and is a preferred model for use by the time series forecasting engine 28. FBProphet is a procedure for forecasting time series data based on an additive model where non-linear trends are fit with yearly, weekly, and daily seasonality, plus holiday effects. FBProphet can work well with time series that have strong seasonal effects and several seasons of historical data. FBProphet is robust to missing data and shifts in the trend, and typically handles outliers well.

SARIMA is a class of statistical models for analyzing and forecasting time series data. SARIMA is a generalization of the simpler AutoRegressive Moving Average and adds the notion of integration. Parameters of the SARIMA model are defined as follows: p is the number of lag observations included in the model, also called the lag order; d is the number of times that the raw observations are differenced, also called the "degree of differencing"; q is the size of the moving average window, also called the order of the moving average. The python package pmdarima (Auto-ARIMA) can be used to find the right set of (p, d, q) (P, D, Q) values that exhibit a low AIC (Akaike information criterion) value for each server.

Holt-Winters Exponential Smoothing (ES) can be used for forecasting time series data that exhibits both a trend and a seasonal variation. Holt-Winters-ES can be a powerful prediction algorithm despite being a relatively simple model. Holt-Winters-ES can handle the seasonality in the data set just by calculating the central value and then adding or multiplying the central value to the slope and seasonality, given the right set of parameters for choosing:

level $$L_t = \alpha(y_t - S_{t-S}) + (1-\alpha)(L_{t-1} + b_{t-1});$$

trend $$b_t = \beta(L_t - L_{t-1}) + (1-\beta)b_{t-1},$$

seasonal $$S_t = \gamma(y_t - L_t) + (1-\gamma)S_{t-S}$$

forecast $$F_{t+k} = :_t + kb_t + S_{t+k-S},$$

Gated Recurrent Unit (GRU) Network is a gating mechanism in recurrent neural networks (RNNs) that uses connections through a sequence of nodes to perform machine learning tasks associated with memory. GRU can also solve the vanishing gradient problem that comes with a standard recurrent neural network (RNN). To solve the vanishing gradient problem of a standard RNN, GRU uses an update gate and reset gate. Essentially the gates are two vectors that decide what information should be passed to the output. The gates are trained to keep information from long past time periods, without washing the information through time or removing information that is irrelevant to the prediction.

Various machine learning models such as the above can learn and predict power consumption of a server for a next or future time period. A check can be included for whether the power forecast was successful and if so the forecast (e.g., for the next 20 days or the next 30 days in non-limiting examples) is passed to the hotspots/coldspots prediction engine 30.

Figure 3:
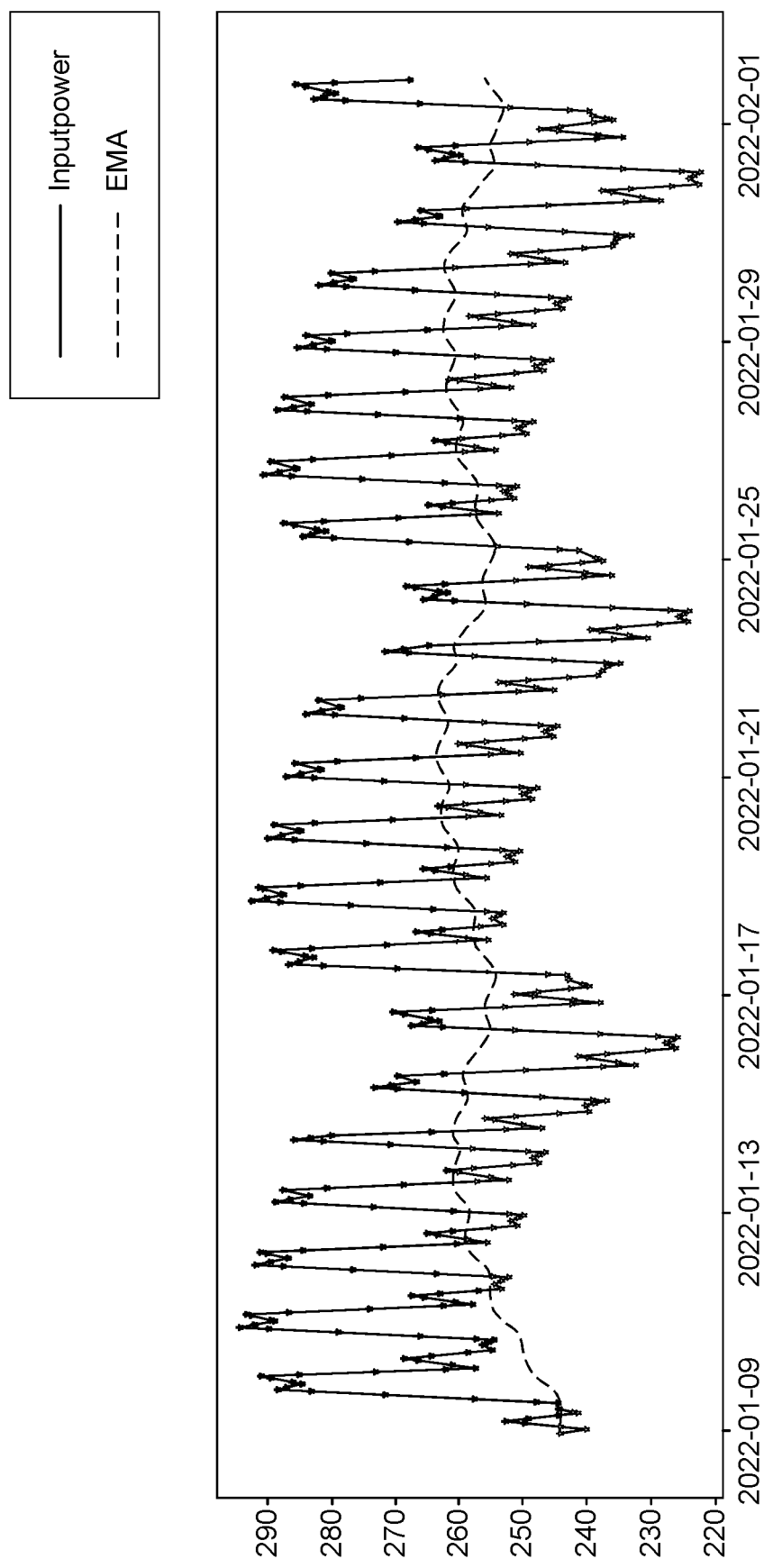
FIG. 3 is a graph showing the classification of hotspots and coldspots in one week of power supply hourly data, according to an example of the application.

The hotspots/coldspots prediction engine 30 identifies time windows (if any) of hotspots and/or coldspots in the forecasted power consumption data obtained from the time series forecasting engine 28. This can be done by calculating an exponential mean average (EMA) of the forecasted power consumption data. The points that are above the EMA are considered to be hotspots, and the points that fall below the EMA are considered to be coldspots. Hotspots are areas of over-utilization and coldspots are areas of under-utilization. An example is shown in FIG. 3, which illustrates a graph depicting the classification of hotspots and coldspots in one week of power supply hourly data and the EMA, according to an example of the application. The points of interest (POIs) above the EMA are classified as hotspots and the POIs falling below the EMA are classified as coldspots.

The hotspots/coldspots prediction engine 30 may create a list of hotspots and coldspots in the forecasted power consumption data (e.g., for one week) and store the list in a database 32. Once the hotspots and coldspots are defined or classified using the EMA line, the hotspots/coldspots prediction engine 30 can run an iteration on the newly found coldspots list, to find consecutive "t" coldspots (since coldspots may also be on an hourly basis). The hotspots/coldspots prediction engine 30 can also run an iteration on the newly found hotspots list, to find consecutive "t" hotspots.

Identified consecutive hotspots or coldspots that fall into a respective time window of hotspots or coldspots, can be used by a user or data administrator unit to schedule a new workload or to revise an existing workload. For example, a user or data administrator unit may specify a time window of "t" hours (e.g., 5 hours in a non-limiting example), in order to find a time window of "t" hours to run a new workload. In that case if consecutive hourly coldspots (e.g., 5 consecutive hourly coldspots) fall into a time window of 5 hours then that time window of under-utilization is a good candidate for scheduling a new workload therein. In examples the "t" hour parameter (e.g., t=5 hours) can be user driven. Thus if a user wishes to schedule a new workload of t hours, the coldspot time windows of t hours will be found. In examples coldspot windows are calculated considering only consecutive data points classified as coldspots, and hotspot windows are calculated considering only consecutive data points as hotspots. In examples workload scheduling based on the hotspots/coldspots can be automated. (It is of course to be understood that the disclosure is not limited to examples of "hourly" time periods and that examples of time periods may be approximately hourly or may be in any other suitable time period such as approximately every 30 minutes or 90 minutes or 120 minutes, or others).

Figure 4:
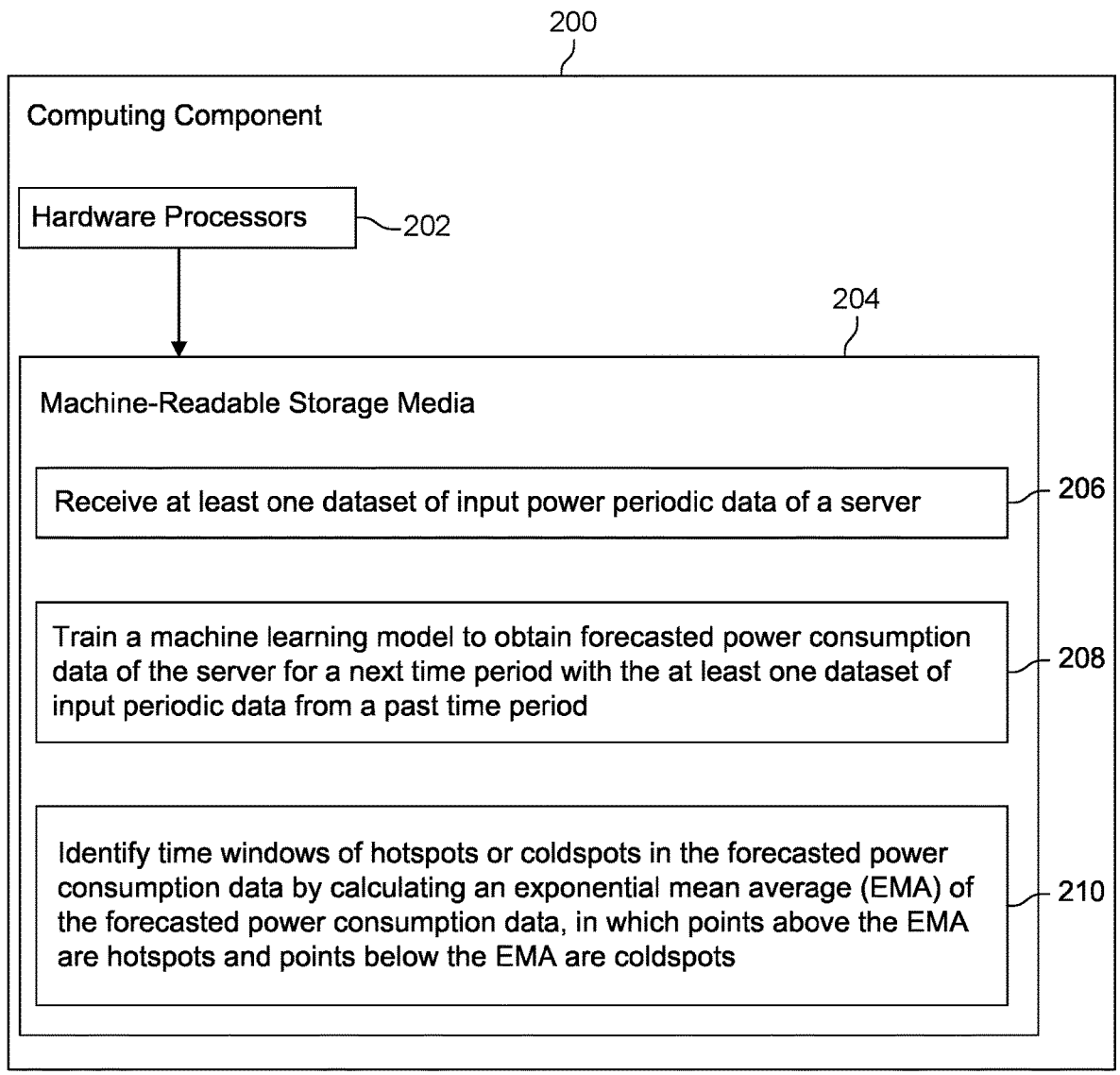
FIG. 4 is a block diagram illustrating an example computing component for training a machine learning model to obtain forecasted power consumption data of a server, and identifying time windows of hotspots or coldspots in the forecasted power consumption data, in accordance with examples of the application.

FIG. 4 is a block diagram illustrating an example computing component 200 for training a ML model to obtain forecasted power consumption data of a server, and identifying time windows of hotspots or coldspots in the forecasted power consumption data, in accordance with examples of the application. The computing component 200 may be, for example, implemented in a cloud-based environment such as SaaS/PaaS using underlying hardware components, a server computer, a controller, or any other similar computing component capable of processing data including for example the computing component 100 shown in FIG. 2. In the example implementation of FIG. 4, the computing component 200 includes a hardware processor 202 and machine-readable storage medium 204. Hardware processor 202 may be similar to hardware processor 22 described above, suitable for retrieval and execution of instructions stored in machine-readable storage medium 204. Hardware processor 202 may fetch, decode, and execute instructions, such as instructions 206-210, to control processes or operations for optimizing the system during run-time. Machine-readable storage medium 204 may be similar to the machine-readable storage medium 24 described above, encoded with executable instructions, for example instructions 206-210.

Hardware processor 202 may execute instruction 206 to receive at least one dataset of input power periodic data from or of a server. This can be sensor data from the server's power supply, such as from the server's Active Health System log. The data may be from any suitable past time period (e.g., 3 months, 6 months, or others). The data may be processed and resampled as described above in connection with FIG. 2 for example, to detect and remove outliers in a dataset of input power periodic data, including linearly interpolating missing values in the dataset.

Hardware processor 202 may execute instruction 208 to train a machine learning model to obtain forecasted power consumption data of the server for a next time period with the at least one dataset of input periodic data from a past time period. As described above, known models for this purpose include FBProphet, SARIMAX, Holt-Winter-ES, GRU Network, and others.

The hardware processor 202 may execute instruction 210 to identify time windows of hotspots or coldspots in the forecasted power consumption data by calculating an exponential mean average (EMA) of the forecasted power consumption data, in which points above the EMA are hotspots and points below the EMA are coldspots. Hotspots as noted above are defined as areas of over-utilization and coldspots are defined as areas of under-utilization. A list of hotspots and coldspots in the forecasted power consumption data may be created and stored, and time windows of hotspots or coldspots can be identified. As an example, consecutive hotspots in a single time window can be identified for scheduling a reduced workload in the single time window, or consecutive coldspots in a single time window can be identified for scheduling an increased workload in the single time window.

Figure 5:
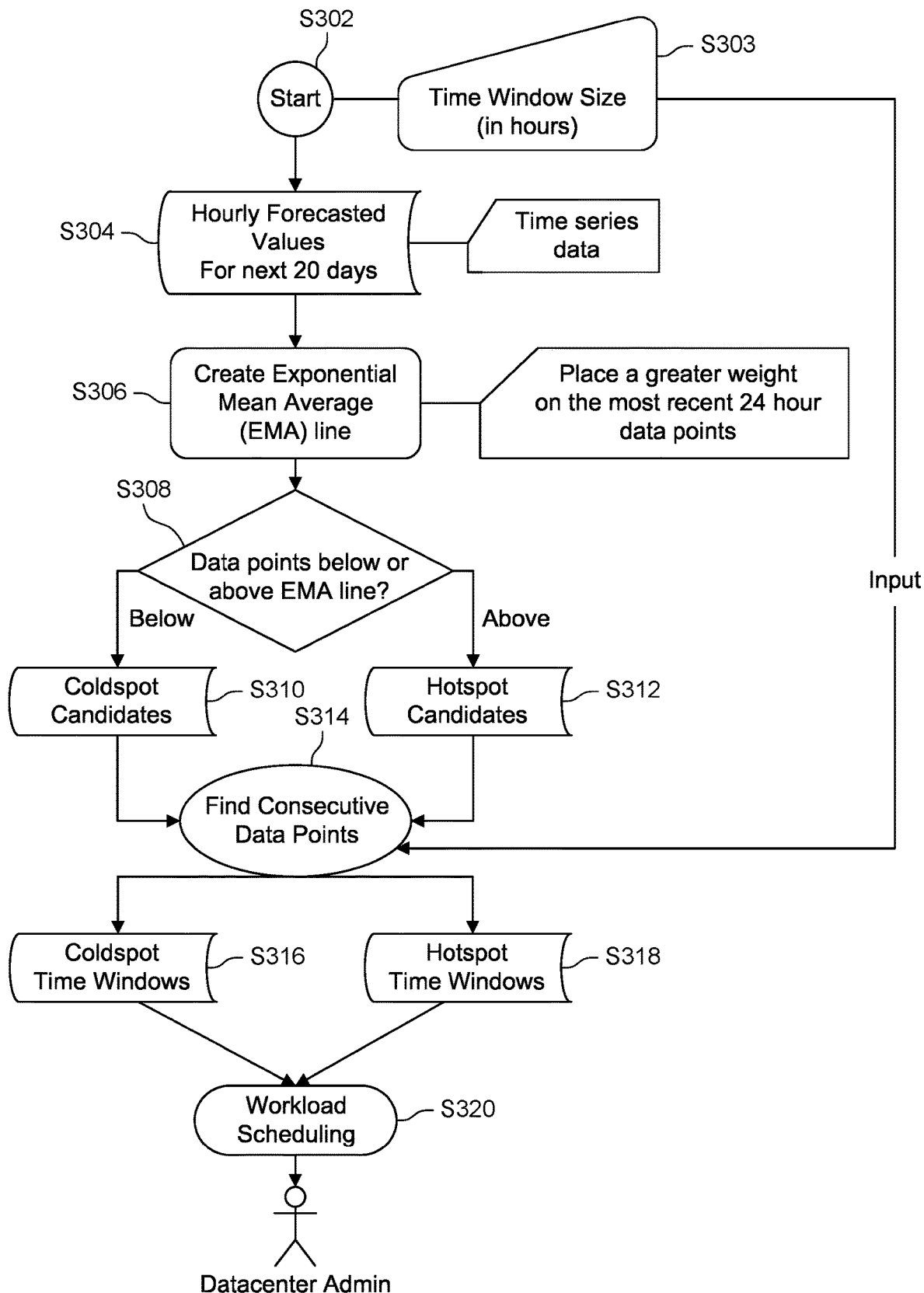
FIG. 5 is a flowchart of a method according to an example of the application.

FIG. 5 is a flowchart of a method 300 that can be carried out by the hotspots/coldspots prediction engine 30 of FIG. 2, according to an example of the disclosure. In Step S302 the method begins. Step S304 includes receiving forecasted power consumption data, e.g., from the time series forecasting engine 28. In the non-limiting example of FIG. 5 the forecasted power consumption data is in the form of hourly forecasted values of time series data for the next 20 days. The forecasted power consumption data can be obtained from a trained machine learning model using at least one dataset of input periodic data from a past time period. As described above, known models for this purpose include FBProphet, SARIMAX, Holt-Winter-ES, GRU Network, and others.

In Step S306 an exponential mean average (EMA) line of the forecasted power consumption data is created. In this example a greater weight is placed on the most recent 24 data points, as more recent data points can be more significant than data points further in the past. In Step S308 it is determined whether any data points exist below or above the EMA line. If BELOW then in Step S310 coldspot candidates are identified consisting of data points below the EMA line. If ABOVE then in Step S312 hotspot candidates are identified consisting of data points above the EMA line. In Step S314 any consecutive data points either below the EMA line (coldspots) or above the EMA line (hotspots) are searched for and located. It is determined whether consecutive data points fit into a defined time window size received in Step S303. If there are two or more consecutive data points below the EMA line in a given time window size then the time window is classified as a coldspot time window in Step S316. If there are two or more consecutive data points above the EMA line in the given time window size then the time window is classified as a hotspot time window in Step S318. Accordingly coldspot and hotspot time windows can be continually identified, and suggested time windows can be continually provided. The coldspot time windows and/or hotspot time windows can then be used in Step S320 in workload scheduling. As an example, consecutive hotspots in a single time window can be identified for scheduling a reduced workload in the single time window, or consecutive coldspots in a single time window can be identified for scheduling an increased workload in the single time window.

The following is a non-limiting example of timeslot suggestions, e.g., identified coldspots or areas of under-utilization as per a time window of 5 hours:

2020 Mar. 21 23:00:00→2020 Mar. 22 04:00:00
2020 Mar. 22 00:00:00→2020 Mar. 22 05:00:00
2020 Mar. 22 01:00:00→2020 Mar. 22 06:00:00
2020 Mar. 22 02:00:00→2020 Mar. 22 07:00:00
2020 Mar. 24 01:00:00→2020 Mar. 24 06:00:00
2020 Mar. 24 02:00:00→2020 Mar. 24 07:00:00
2020 Mar. 24 03:00:00→2020 Mar. 24 08:00:00
2020 Mar. 24 04:00:00→2020 Mar. 24 09:00:00
2020 Mar. 24 05:00:00→2020 Mar. 24 10:00:00

New workloads can be scheduled in the above time slots, for example, so as to reduce areas of under-utilization. The outputs may be generated in JSON REST request payload. They can be understood as time intervals in which coldspots and hotspots are forecast to occur. The outputs provide either coldspot or hotspot intervals in the forecasted power consumption data of a server. This can help data center administrators plan exiting workloads more efficiently and introduce new workloads at more optimum time periods.

A technical effect of the disclosure is that more optimal server and data center utilization can be achieved. The power consumption of a server is fundamentally workload driven in a proportional way: the greater the load that is placed on a server the more power that is consumed. The total power gives the power of a server, rather than using individual components. By virtue of the features of the disclosure, patterns of usage, and hotspots/coldspots, can become more clear.

Figure 6:
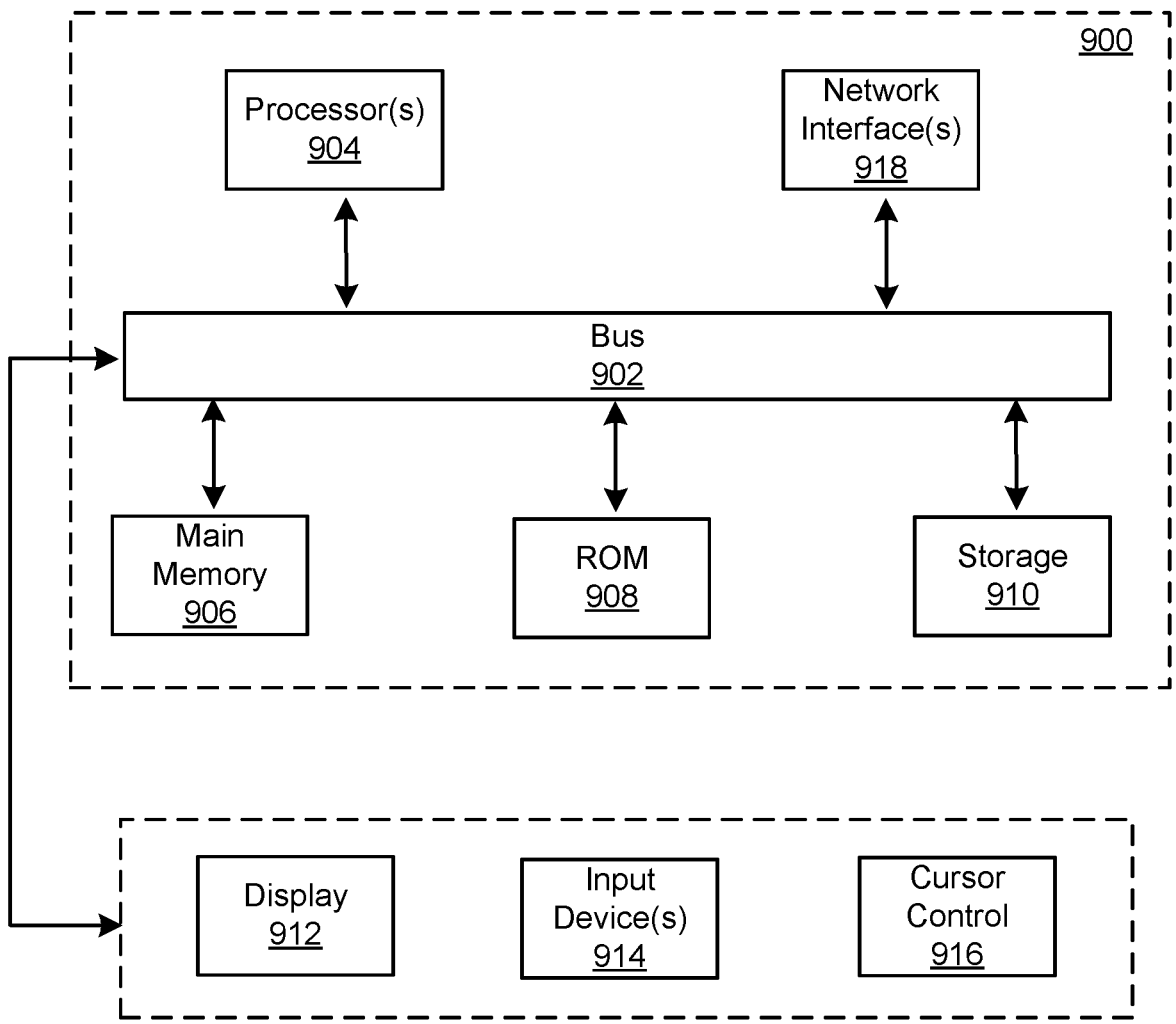
FIG. 6 is an example computing component that may be used to implement various features of examples described in the application.

FIG. 6 depicts a block diagram of an example computer system 900 in which various of the examples described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some examples, the same direction information and command selections as cursor control may be implemented via receiving touches on a touch screen without a cursor.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one example, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

What is claimed is:

1. A computing component, comprising:
   at least one processor; and
   a memory unit operatively connected to the at least one processor, the memory unit including instructions that, when executed, cause the at least one processor to:
   train a machine learning model to obtain forecasted power consumption data of a server for a next future time period with at least one dataset, received from the server, of input periodic data from a past time period;
   calculate an exponential mean average (EMA) of the forecasted power consumption data;
   compare points of the forecasted power consumption data to the EMA;
   identify consecutive points of forecast power consumption above the EMA as a time window of hotspots and consecutive points of forecast power consumption below the EMA as a time window of coldspots; and
   schedule a workload to be executed during the time window of coldspots.

2. The computing component of claim 1, wherein the memory unit includes instructions that when executed further cause the at least one processor to identify a time window as a time window of hotspots only when all points of forecast power consumption in the time window are above the EMA, and identify a time window as a time window of coldspots only when all points of forecast power consumption in the time window are below the EMA.

3. The computing component of claim 1, wherein the memory unit includes instructions that when executed further cause the at least one processor to schedule a reduced workload to be executed during the time window of hotspots.

4. The computing component of claim 1, wherein the input periodic data is received from an Active Health System Log of the server.

5. The computing component of claim 1, wherein the server comprises the computing component.

6. A computer-implemented method, comprising:
   training a machine learning model to obtain forecasted power consumption data of a server for a next future time period with at least one dataset of input periodic data from a past time period;
   calculating an exponential mean average (EMA) of the forecasted power consumption data;
   comparing points of the forecasted power consumption data to the EMA;
   identifying consecutive points of forecast power consumption above the EMA as a time window of hotspots and consecutive points of forecast power consumption below the EMA as a time window of coldspots; and
   scheduling a workload to be executed during the time window of coldspots.

7. The computer-implemented method of claim 6, wherein the points of the forecasted power consumption are approximately hourly.

8. The computer-implemented method of claim 7, wherein a number of consecutive points of forecast power consumption in the time window of hotspots is 5.

9. The computer-implemented method of claim 7, wherein a number of consecutive points of forecast power consumption in the time window of coldspots is 5.

10. The computer-implemented method of claim 6, further comprising reducing a planned workload to be executed during the time window of hotspots.

11. The computer-implemented method of claim 6, further comprising receiving the at least one dataset of input periodic data of the server.

12. The computer-implemented method of claim 6, wherein the input periodic data is received from an Active Health System Log of the server.

13. A non-transitory machine-readable storage medium comprising instructions executable by a processor, the instructions programming the processor to:
   receive at least one dataset of input periodic data of a server;
   using a trained machine learning model to obtain forecasted power consumption data of the server for a next future time period, the machine learning model being trained with the at least one dataset of input periodic data from a past time period;
   calculating an exponential mean average (EMA) of the forecasted power consumption data;
   comparing points of the forecasted power consumption data to the EMA;
   identifying consecutive points of forecast power consumption above the EMA as a time window of hotspots and consecutive points of forecast power consumption below the EMA as a time window of coldspots; and scheduling a workload to be executed during the time window of coldspots.

14. The non-transitory machine-readable storage medium of claim 13, wherein the points of the forecast power consumption are approximately hourly.

15. The non-transitory machine-readable storage medium of claim 14, wherein a number of consecutive points of forecast power consumption in the time window of hotspots is 5.

16. The non-transitory machine-readable storage medium of claim 14, wherein a number of consecutive points of forecast power consumption in the time window of coldspots is 5.

17. The non-transitory machine-readable storage medium of claim 13, the instructions further programming the processor to schedule a reduced workload to be executed during the time window of hotspots.

18. The non-transitory machine-readable storage medium of claim 13, wherein the input power periodic data is received from an Active Health System Log of the server.

19. The computer-implemented method of claim 13, wherein before the received at least one dataset of input power periodic data of the server is inputted into the machine learning model the at least one dataset is processed to interpolate any missing values from the at least one dataset and to detect and remove outliers in the at least one dataset.

20. The computer-implemented method of claim 13, wherein the machine learning model is one of SARMA, FBProphet, Holt-Winter-ES, or Gated Recurrent Unit Network.

* * * * *